United States Patent
Carlson

[15] 3,673,934
[45] July 4, 1972

[54] AUTOMATIC FILTER ACTUATOR FOR A CARTRIDGE LOAD CAMERA

[72] Inventor: Richard K. Carlson, Chicago, Ill.
[73] Assignee: Bell & Howell Company, Chicago, Ill.
[22] Filed: Sept. 2, 1969
[21] Appl. No.: 854,485

[52] U.S. Cl. ................................95/11, 352/66, 352/72, 95/12
[51] Int. Cl. .................................................G03b 17/12
[58] Field of Search ...........................95/11, 12; 352/66, 72

[56] References Cited

UNITED STATES PATENTS 3,395,630  8/1968  Haufler.....................................95/11

Primary Examiner—John M. Horan
Attorney—William F. Pinsak

[57] ABSTRACT

This disclosure describes an automatic filter actuator for use in a cartridge load camera. A rod, having mounted thereon a torsion-compression spring and a lever arm, is aligned with a code notch in the cartridge. A filter is mounted on one end of the lever arm and the other end of the lever arm selectively impinges on a flat spring attached to the camera housing. When the film compartment door of the camera is closed and notch is present, the flat spring does not contact the lever arm and the filter remains in front of the camera lens. When the cartridge has no notch, the rod and lever arm are axially moved to a point where the lever arm impinges on the flat spring and, hence, the filter is moved from in front of the lens when the film compartment door is closed.

4 Claims, 4 Drawing Figures

PATENTED JUL 4 1972

3,673,934

Inventor:
Richard K. Carlson.

By William F. Pusch Atty

AUTOMATIC FILTER ACTUATOR FOR A CARTRIDGE LOAD CAMERA

Cartridge load cameras, particularly cartridge load motion picture cameras, are well known. The cartridges of cartridge load motion picture cameras, such as Super-8 cameras, have notches located along their front edge. The presence or absence of a particular notch is determined by the type of film in the camera. The presence or absence of the notches is sensed by movable projecting elements which are adapted to vary certain features of the camera. Hence, the presence or absence of a particular notch "sets up" the camera so that the film in the cartridge will take viewable pictures.

One feature of a motion picture camera that is varied by the presence or absence of a notch, and the one to which this invention is directed, is the presence or absence of a filter in front of the camera's lens. That is, certain films require that a color temperature correction filter be located in front of the camera's lens when a picture is being taken. Other films do not require such a filter. In accordance with well established criteria of the home movie making industry, the presence of a notch located at a particular point on the front edge of a Super-8 film cartridge determines that a color temperature correction filter is needed for the film in that particular cartridge. The absence of such a notch determines that a color temperature correction filter is not necessary.

A filter for color temperature correction, or type "A" filter as it is also known, must physically cover the entire light path of the camera's lens and, therefore, must be at least three-eighths inch in diameter. Hence, to move and remove the filter from in front of the camera's lens, a stroke of travel in excess of three-eighths of an inch must be imparted to the filter holding mechanism. The code notch design of a Super-8 cartridge and the mode of operation of the camera's projecting elements are not ideal for accomplishing this three-eighths inch stroke directly. That is, insertion of a Super-8 cartridge into a camera imparts motion to the filter actuator mechanism in the wrong direction (parallel to the lens axis). In addition, to facilitate cartridge entry, the stroke is very limited (approximately one-eighth of an inch). These limitations result in the requirement for a mechanism that must both change the direction of motion and multiply the distance of motion by at least 3/1.

Because of the foregoing limitations, prior art mechanisms have usually used a gear drive train to move the filter in front of the camera's lens when necessary (or remove it from in front of the lens when necessary, if it is normally in front of the lens). While these systems have been adequate, they have not been entirely satisfactory because gear drive trains are sensitive to tolerances. In addition, they are complex, thereby making them relatively expensive to manufacture. Another example of prior art apparatus for moving a filter in front of the camera's lens is described in U.S. Pat. No. 3,395,630 to Haufler et al. Apparatus such as described in that patent use a helical spring operated by a sensing pin to cause a rotational movement of a lever arm having mounted thereon a filter. The sensing pin can rotate and includes an angulated slot which coacts with a fixedly mounted finger element to cause the desired rotational movement. While apparatus of this nature is less complex than gear drive mechanisms, they are still more complex than desirable. In addition, a slot and finger system is subject to binding, unless precisely formed.

Therefore, it is an object of this invention to provide an automatic filter actuator mechanism suitable for use in a cartridge load camera.

It is another object of this invention to provide an automatic filter actuator mechanism suitable for use in a cartridge load motion picture camera that is low in cost and high in reliability.

It is a further object of this invention to provide a filter actuator suitable for use in a cartridge load motion picture camera that automatically inserts a color temperature correction filter in front of the lens of the motion picture camera when a suitable notch is located along a predetermined edge of the cartridge.

In accordance with a principle of this invention, an automatic filter actuator for use with a cartridge load movie camera is provided. The actuator comprises a rod mounted in the camera so that it is longitudinally movable and also axially rotatable. The rod is mounted so that one end is aligned with a color filter code notch in a cartridge when a cartridge is held in the camera. A lever arm is attached to the other end of the shaft and a torsion-compression spring is mounted on the shaft. A filter is mounted on one end of the lever arm and, the other end of the lever arm selectively impinges on a portion of the camera.

In accordance with a further principle of this invention, a flat spring is attached to the camera's housing. The flat spring coacts with the lower edge of the film cartridge compartment door of the camera to move the lever arm and remove the filter from in front of the camera's lens when an unotched cartridge is contained in the camera.

It will be appreciated from the foregoing description that the invention provides an automatic filter actuator for use with a cartridge load camera. The actuator is uncomplicated and, therefore, inexpensive to manufacture. More specifically, the actuator basically requires four operative parts: a rod; a lever arm; a torsion-compression spring; and, a flat spring. With these elements suitably mounted in a cartridge load camera, an automatic actuator that is uncomplicated, inexpensive, and reliable is provided.

Further and other objects of the invention will be apparent from the description of the accompanying drawings in which like numerals refer to like parts.

Figure 1:
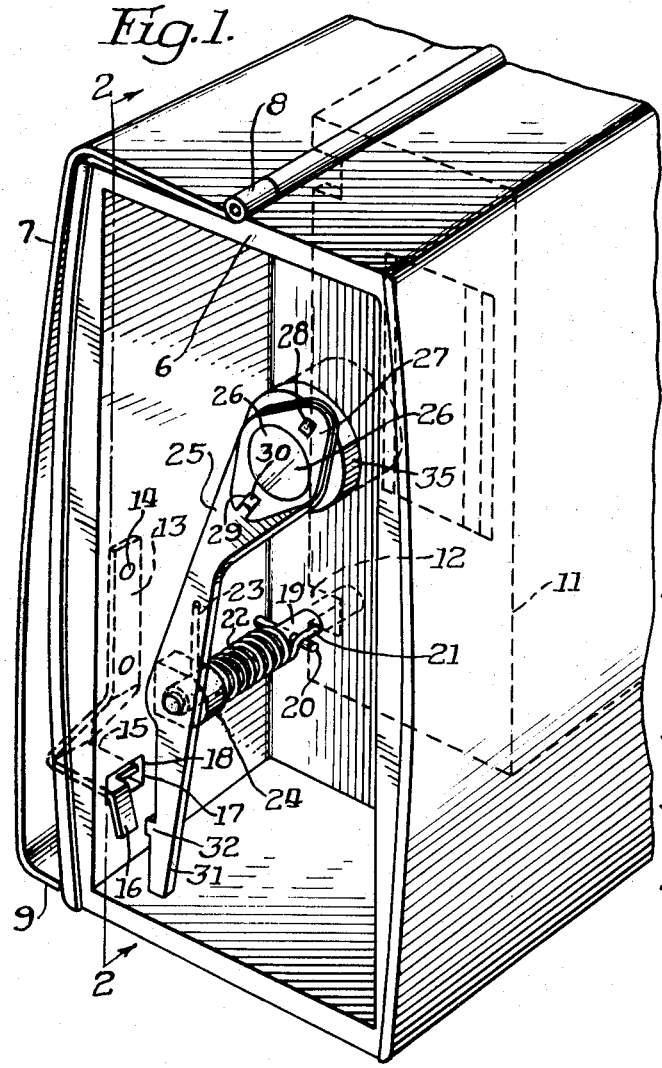
FIG. 1 is a fragmentary perspective view of a camera with one end broken away in order to illustrate the mechanism operated by the film compartment door.

Referring to the various views, 6 designates the skeletal structure, or housing, of a camera which is enclosed by a closure bracket 7, articulately secured at 8 and provided with a springy portion 9 adapted to engage a shoulder 10 to form a flush and smooth exterior.

The housing 6 of the camera has attached thereto a flat spring 13 secured by rivets 14 or any other suitable fastening such as grommets. The flat spring 13 is provided with a spring knee 15 and terminates in a locking tooth 16 somewhat narrower than the width of said spring 13, as shown at 18; said tooth 16 operating within the confines of slotted portion 17 so that the spring 13 moves within the distance illustrated by the full and dotted lines in FIG. 2.

The rod 19 has a cross-pin 20 secured thereto which serves to anchor end 21 of torsion spring 22, the other end 23 of which rests against the inner wall of the camera. Lever 25 is articulately operative in bearing 24 and is suitably fixed to pin 19.

Lever 25 has secured thereto a holding element 27 for a filter 26 made of colored translucent material and having fastenings 28 and 30 so that element 27 is secured by means of slotted portion 29 and hence is readily replaceable when damaged or when a change of filter should be more desirable.

The lower end 31 of lever 25 is equipped with a toothed portion 32 releasably engageable by spring locking tooth 16. The film 34, by virtue of its perforations is moved by a claw mechanism (not shown) between the confines of lens 35 and filter 30 when that condition prevails.

The presence of a notch 12 in film cartridge 11 does not actuate the filter mechanism showing that the same remains normally in the position shown by full lines (see FIGS. 2 and 3), namely when natural light is the film exposure condition.

Figure 2:
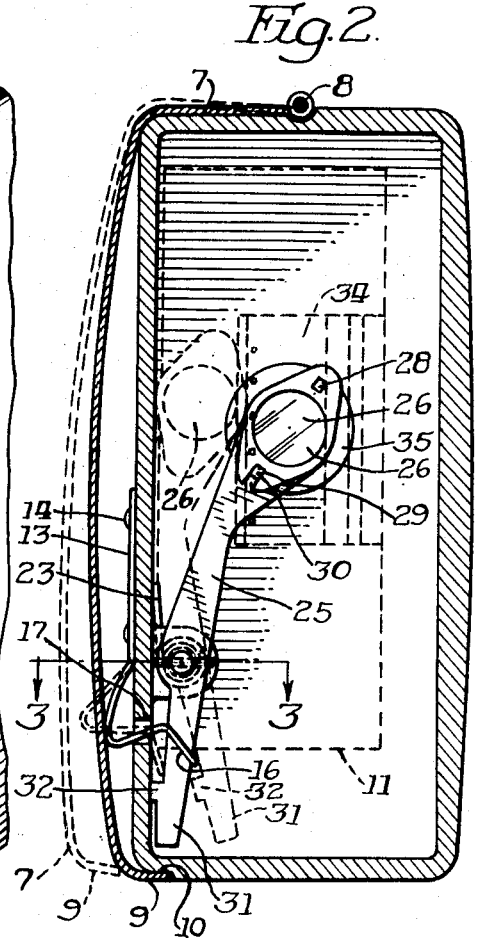
FIG. 2 is a transverse cross-sectional view taken substantially on the line 2—2 of FIG. 1 looking in the direction of arrows.
Figure 3:
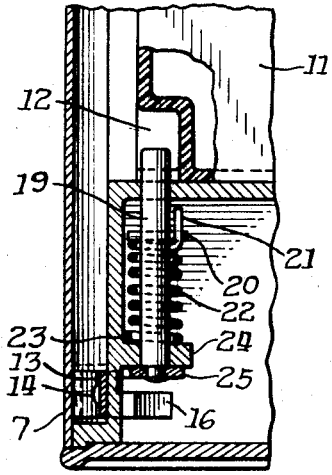
FIG. 3 is a fragmentary cross-sectional view taken substantially on the line 3—3 of FIG. 2 indicating that the filter mechanism is in front of the camera lens to temper the natural light conditions.
Figure 4:
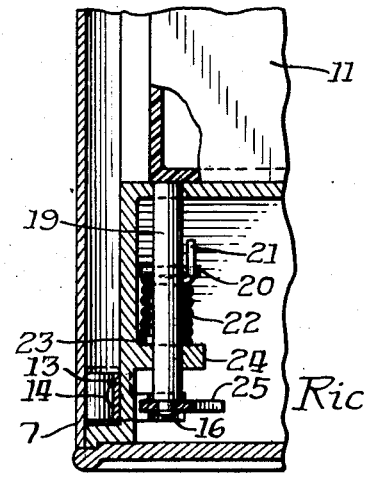
FIG. 4 is a view identical with FIG. 3 and draws a cartridge inserted in a camera which does not require filter modification.

However, when artificial light is used to expose the film 34, the film cartridge 11 has no notch portion 12 and consequently the filter actuator mechanism is activated and brought to the position shown in the dotted lines in FIGS. 2 and 4, where it can be noted that the pin 19 is toward the front of the camera, thus compressing spring 22 and bringing into alignment and engagement the spring tooth with the tooth 32 of lever 25.

Hence, it is to be deduced from the foregoing that film cartridges made for exposure to natural light need to have the natural light tempered by a filter and consequently are provided with a notch 12 which allows the filter 30 to remain in front of the lens 35; and contrariwise when artificial light is employed, for example, when taking exposures indoors, then the light being of a lesser intensity, the filter is activated to a position indicated by the dotted lines.

The film 34 is positioned so as to have its exposed portion behind the filter 26 and behind lens 35.

What is claimed is:

1. A filter mechanism in a cartridge loaded camera for properly positioning a filter with respect to an optical system within said camera in response to a notch code in said cartridge comprising:
   - a lever mounted within said camera for limited linear and rotational movement;
   - a filter mounted on said lever;
   - means responsive to a notch code in said cartridge for linearly moving said lever parallel to the optical axis of said optical system to a predetermined point; and
   - means for acting on said lever to rotate said filter such that it is in a predetermined position with respect to said optical system when said lever is at said predetermined point.

2. A selectively insertable filter mechanism in a cartridge loaded camera comprising:
   - a lever mounted within said camera for linear and rotational movement;
   - a filter mounted on said lever;
   - means biased to a position within the cartridge chamber of said camera for acting on said lever to produce said linear movement from a first point to a second point when a cartridge having no filter notch is inserted in said chamber;
   - means for biasing said filter to a first position;
   - and selectively operative means for rotating said filter from said first position to a second position, said filter being in the optical system of said camera in one of said positions and removed from said optical system in the other of said positions, said selectively operative means being operative to produce said rotation when said lever is at one of said points and inoperative to produce said rotation at the other of said points.

3. A color temperature correction mechanism in a cartridge loaded camera comprising:
   - a lever mounted within said camera for linear movement between first and second points and for rotational movement;
   - means responsive to the absence of a notch in said cartridge for linearly moving said lever from said first point to said second point;
   - a temperature correcting filter disposed on said lever for movement therewith between a first position in the optical system and a second position removed from said optical system;
   - means for biasing said lever to said first point and said filter to said first position; and
   - means associated with said camera for acting on said lever to rotate said filter to said second position, whereby when the camera is loaded with a cartridge having a filter notch the correcting filter is disposed within the optical system of the camera and when the camera is loaded with a cartridge having no filter notch the filter is removed from the optical system of said camera.

4. A selectively insertable filter mechanism in a cartridge load camera comprising:
   - a rod mounted in said camera for axial sliding movement and for rotational movement about said axis;
   - a lever mounted on said rod;
   - a filter mounted on said lever;
   - a torsion-compression spring for biasing said filter into the optical system of said camera and for biasing said rod into the chamber within said camera for containing said cartridge;
   - a spring member associated with the housing of said camera for engaging said lever and rotating said filter out of said optical system when said camera is loaded with a cartridge that does not include a filter notch.

* * * * *